(12) United States Patent
Sun et al.

(10) Patent No.: US 10,936,300 B1
(45) Date of Patent: Mar. 2, 2021

(54) LIVE SYSTEM UPDATES

(71) Applicant: Amazon Technologies, Inc., Reno, NV (US)

(72) Inventors: Jiming Sun, Issaquah, WA (US); Tsung Ho Wu, Pleasanton, CA (US); Bradshaw Darrow Austin, University Place, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 16/433,892

(22) Filed: Jun. 6, 2019

(51) Int. Cl.
*G06F 9/44* (2018.01)
*G06F 8/656* (2018.01)
*G06F 16/23* (2019.01)

(52) U.S. Cl.
CPC .......... *G06F 8/656* (2018.02); *G06F 16/2365* (2019.01)

(58) Field of Classification Search
CPC .............................. G06F 8/656; G06F 16/2365
USPC .................................. 717/168–177; 709/203
See application file for complete search history.

(56) References Cited

U.S. PATENT DOCUMENTS

| | | | | |
|---|---|---|---|---|
| 5,844,986 A * | 12/1998 | Davis | ..................... | G06F 21/572 713/187 |
| 6,438,688 B1 * | 8/2002 | Nunn | ........................ | G06F 8/65 709/220 |
| 7,017,040 B2 * | 3/2006 | Singer | ................... | G06F 21/572 710/8 |
| 7,203,831 B2 * | 4/2007 | Wu | ....................... | H04L 41/082 713/100 |
| 7,213,152 B1 * | 5/2007 | Gafken | ..................... | G06F 8/65 713/187 |
| 7,284,236 B2 * | 10/2007 | Zhou | ....................... | G06F 8/656 717/121 |
| 7,337,309 B2 * | 2/2008 | Nguyen | .................... | G06F 8/65 713/1 |
| 7,558,867 B2 * | 7/2009 | Le | .............................. | G06F 8/65 709/203 |
| 8,776,254 B1 * | 7/2014 | Mraz | ..................... | H04L 63/123 713/150 |
| 8,874,922 B2 * | 10/2014 | Jaber | ....................... | G06F 21/57 713/153 |
| 8,887,144 B1 * | 11/2014 | Marr | ..................... | H04L 41/082 717/168 |

(Continued)

OTHER PUBLICATIONS

Jex, "Flash Memory BIOS for PC and Notebook Computers", IEEE, pp. 1-4 (Year: 1991).*

(Continued)

*Primary Examiner* — Anil Khatri
(74) *Attorney, Agent, or Firm* — Hogan Lovells US LLP

(57) ABSTRACT

Various embodiments provide for the live updating of system software or firmware, such as BIOS information, without the need for a reboot. A payload containing BIOS update information can be generated and signed with an encryption key. The information in the payload is able to be updated through a live update, and can be selected in part based on the configuration and BIOS version of the computing device to be updated. Upon an update being triggered, a target device is placed into a management mode wherein normal work is suspended and the device is isolated. The payload is verified and decrypted, and appropriate functions called in order to update the relevant BIOS information. After the update is verified, the device exits management mode and resumes a typical workflow. If the update is not successful, or unable to be performed via live update, a conventional update can be performed that includes a reboot.

20 Claims, 7 Drawing Sheets

(56) References Cited

U.S. PATENT DOCUMENTS

| | | | | |
|---|---|---|---|---|
| 8,904,162 B2* | 12/2014 | Futral | ............... | G06F 9/445 |
| | | | | 713/2 |
| 8,924,950 B2* | 12/2014 | McDonald | ............ | G06F 8/65 |
| | | | | 717/170 |
| 9,110,679 B1* | 8/2015 | Chan | ............... | G06F 9/4411 |
| 9,182,998 B2* | 11/2015 | Inbaraj | ............ | G06F 8/65 |
| 9,851,980 B1* | 12/2017 | Li | ............... | G06F 9/44 |
| 2006/0143600 A1* | 6/2006 | Cottrell | ............ | G06F 21/572 |
| | | | | 717/168 |

OTHER PUBLICATIONS

Hicks et al, "Dynamic Software Updating", ACM, pp. 1049-1096 (Year: 2005).*

Yohan et al, "Secure and Lightweight Firmware Update Framework for IoT Environment", IEEE, pp. 1-2 (Year: 2019).*

Chang et al, "Dynamic software update model for remote entity management of machine-to-machine service capability", IEEE, pp. 32-39 (Year: 2013).*

Kim et al, "Remote Progressive Firmware Update for flash-Based Networked Embedded Systems" < ACM, pp. 407-412 (Year: 2009).*

Giloi et al, "Firmware engineering: Methods and tools for firmware specification and design", Firmware Engineering, pp. 49-56 (Year: 1981).*

Previtali et al, "Aspect-Based Dynamic Software Updating: A Model and its Empirical Evaluation", ACM, pp. 105-116 (Year: 2011).*

Bazzi et al, "Dynamic Software Updates: The State Mapping Problem", ACM, pp. 1-2 (Year: 2009).*

\* cited by examiner

LIVE SYSTEM UPDATES

BACKGROUND

Certain types of system software or firmware for a computing device require a reboot or restart of that device in order to update or apply changes. This can include Basic Input/Output System (BIOS) or other software/firmware used for providing runtime services on the device. Updates may be required for many reasons, such as may relate to performance tuning or bug fixes. The need to reboot or shutdown the device can be undesirable, as it results in a temporary unavailability of the device. In a setting such as a data center where a large number of servers may support a large number of users, the unavailability of one or more servers can have a significant impact on the business of both the customer and the resource provider. The undesirability of a reboot often causes providers to delay updates until a device unexpectedly shuts down due to errors, or until there is an opportunity for scheduled maintenance, which can have unknown impact on customers' data and performance requirements. Studies have revealed that BIOS updates can resolve approximately 99% of server fleet issues, as the BIOS is in the best position to work around or fix system issues. Unfortunately, there is no conventional way to update the BIOS or other system software/firmware without at least some amount of server unavailability.

BRIEF DESCRIPTION OF THE DRAWINGS

Various embodiments in accordance with the present disclosure will be described with reference to the drawings, in which.

DETAILED DESCRIPTION

Approaches in accordance with various embodiments provide for the updating of system software and/or firmware in a computing device. In particular, various embodiments provide for the live, or runtime, updating of system software or firmware, such as system BIOS, without the need for a restart or reboot. A payload containing BIOS update information can be generated and signed with a determined encryption key. The BIOS update information can include information about updates for unlocked registers, Input/Output (I/O) control pins, integrated component states, runtime data, runtime interface software, runtime loadable software, or other memory locations where information is updatable through a live update process. The information in the payload can also be selected in part based on the configuration of the target device(s) and current version of the BIOS to be updated. Upon an update being triggered, a target device can be placed into a management mode wherein work is suspended on the device for purposes of the live update. The payload can be verified, decrypted, and transferred to the appropriate location (e.g., to reserved memory on a host machine), with appropriate functions being called in order to update the relevant BIOS information. The update can be verified, and then the device is caused to exit management mode and resume a typical workflow. If the update is not successful, or not all of the BIOS update is able to be done using a live update process, then a conventional BIOS update can be performed that includes a reboot or restart of the device in order for the update to take effect.

In the description herein, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. Various other functions can be implemented within the various embodiments as well as discussed and suggested elsewhere herein.

Figure 1:
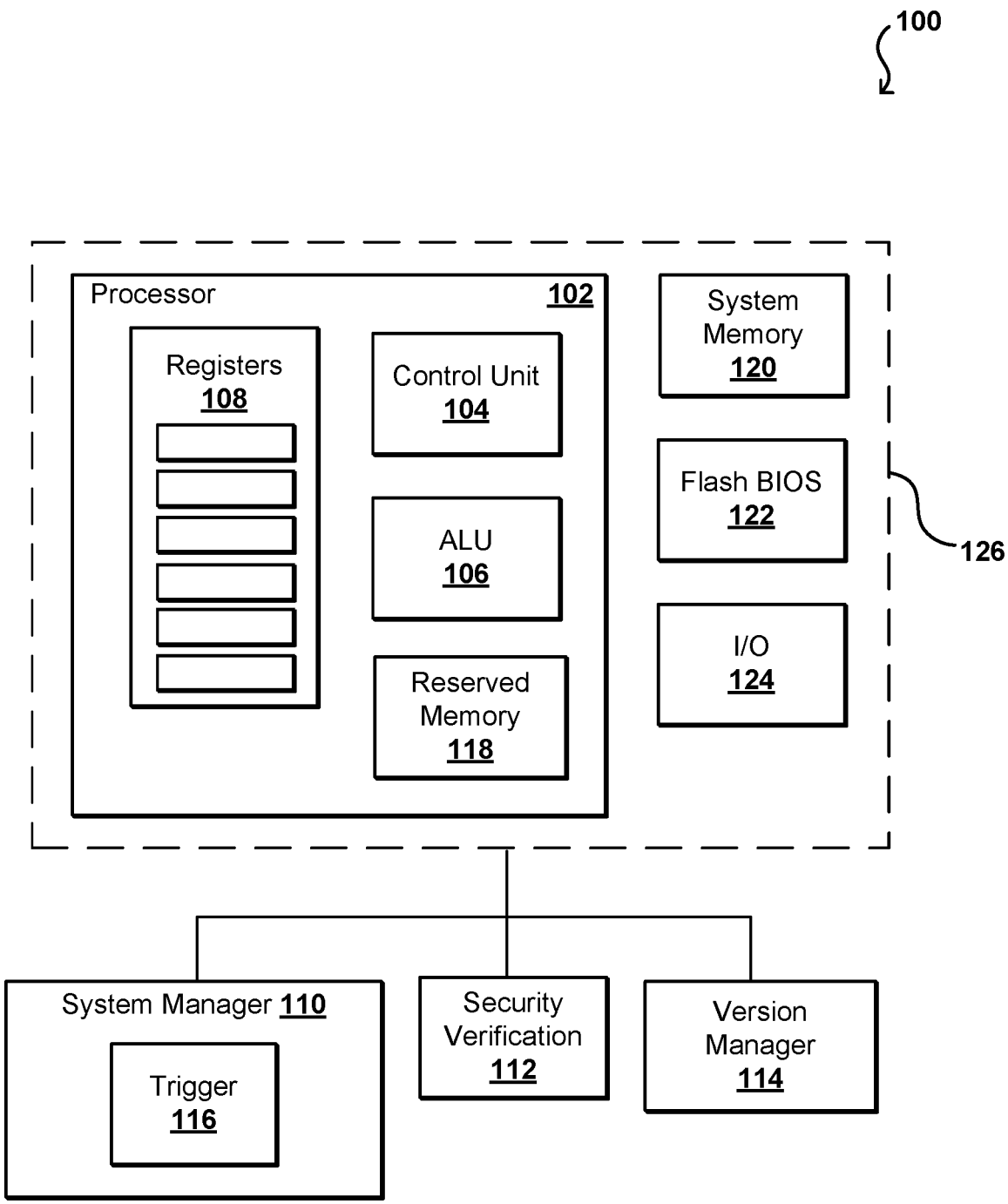
FIG. 1 illustrates components of an example computing system that can be utilized in accordance with various embodiments.

FIG. 1 illustrates components of an example computing system 100 that can be utilized in accordance with various embodiments. The components illustrated may be part of a single computing device, or a set of networked computing devices, in various embodiments. For example, components in the dotted box 126 may be on a single server, while components outside the box may be part of separate systems or services, as may be available over one or more networks. Devices such as the verification module 112 may be provided by a card inserted into the server 126 as well, among other such options.

In this example, a computing device such as a server will include at least one processor 102. Different servers may have different numbers of processors or one or more types, as may include central processing units (CPUs) and graphics processing units (GPUs), among other such options. As known in the computing arts, a CPU can include electronic circuitry that can be used to execute instructions of one or more computing programs by performing basic operations specified by the instructions. A CPU will often include a control unit 104 for managing the fetching of instructions from memory and the execution of those instructions, as well as an arithmetic logic unit (ALU) 106 to perform arithmetic and logic operations. The CPU will also include a number of processor registers 108 for supplying operands to, and storing results from, the ALU 106. The control unit 104 can coordinate the operations of the ALU, the processor registers, and other such components. In many instances, the processor 102 will be a microprocessor of a single integrated circuit (IC) chip, as may be part of a system-on-chip (SoC) design, which can include components such as system memory 120, input/output interfaces and/or devices 124, and the like. The processor in some embodiments may also be a multi-core processor that includes two or more cores for parallel execution of instructions.

As mentioned, such a computing device may utilize system software or firmware, which may take the form of a BIOS in some embodiments. The BIOS can comprise the program code used by the processor to initialize the computing device at startup or reboot. The BIOS can also manage data flow between the operating system (OS) and attached devices, as may include system memory 120, computer-readable media or data storage, a video adapter, or I/O devices such as a keyboard, mouse, or printer, among other such options. The BIOS can be accessible to the processor 102 via an erasable programmable read-only memory (EPROM) chip, also referred to as the flash BIOS 122. When the computing device is to be initialized, such as at startup, the processor 102 can pass control to the BIOS program on EPROM. Among other tasks, the BIOS can load portions of the operating system into system memory 120. The BIOS can manage details of various devices on behalf of the OS and respective applications. When details about those devices change, only the BIOS needs to be updated in many instances. The BIOS may be updates for other purposes or reasons as well, such as to fix bugs, switch to a different BIOS version, or improve system performance, among other such options.

As mentioned, however, the need to reboot, restart, or shutdown a computing device to update the BIOS, or other such system software or firmware, can result in a temporary unavailability of the device. This can have a negative impact on users of the device, as well as a provider of the device for a data center or other such multi-tenant or shared-resource environment. Even in situations where the reboots can be scheduled ahead of time to occur at times of low utilization, such reboots can still have a significant impact. As mentioned, attempting to delay or ignore critical BIOS updates can lead to unexpected shutdowns or reboots, which can be significantly worse for both customers and the resource provider.

Accordingly, approaches in accordance with various embodiments provide mechanisms for performing a live and/or runtime update of system software and/or firmware. This can include, for example, the ability to perform at least some modifications or updating of a system BIOS without requiring a reboot or other such action for the change to take effect. In various embodiments, a system manager 110 can cause at least a portion of the computer system to operate in a system management mode. As mentioned elsewhere herein, the system management mode can take the form of SMM used for x86 and other such processors, that is intended for use by the system BIOS or firmware to perform system-level operations while the operating system is active. An SMM can be triggered through a system management interrupt (SMI), for example, which can be sent from the chipset to the processor. While in SMM, the firmware can store the state of the processor in a designated region of memory. A trigger component 116 (such as from a system controller) can be used to initiate the update. Although the trigger 116 is illustrated as part of the system manager 110 in this example, it should be noted that the trigger could be part of a version manager 114 or a separate component, among other such options. The system manager can store information for the BIOS in reserved memory 118, and this information can be used to update the BIOS information stored to the registers 108 of the CPU in at least some embodiments. The version manager 114 may be part of a centralized system or service in some embodiments, such as may be responsible for periodically triggering updates to firmware and software to devices across a server fleet.

In some embodiments a system management mode can be triggered by coordinated software components across drivers and applications in the OS, as well as other software components in the system that can help to ensure the security and integrity of the system. In at least some embodiments, the system manager 110 can cause the system to be placed in an isolated environment such that no external access is permitted during the live update of the BIOS (to prevent tampering, conflicting instructions, etc.). The components involved can include, for example, a security verification module 112 to verify the appropriate security information and/or permissions before performing an update. The security verification module 112 can be on the computing device, on a separate management server, or provided through a peripheral card installed on the computing device, among other such options. In some embodiments, a binary can be provided or maintained that contains the updates of the system firmware (e.g., BIOS) that can change system behavior by fixing system bugs, correcting errors, increasing performance, or changing input/output functions of the system. As mentioned, these can be performed using a non-interrupting process and with minimum impact to the applications or functionality executing on the relevant device(s). As mentioned, various aspects of the BIOS can be live updated in such a way, where those aspects can include microcode patches, general purpose I/O (GPIO), Model Specific Register (MSR) controlled I/O, System Management Mode (SMM) firmware, and System Management BIOS (SMBIOS), among other such options. There may be other components or aspects of the system software or firmware that may be unable to be updated through such a process in some embodiments, and may require a reboot or restart, but the live updatable components can comprise at least 80% of updates that are required in a well validated system in a server fleet in accordance with various embodiments.

Figure 2:
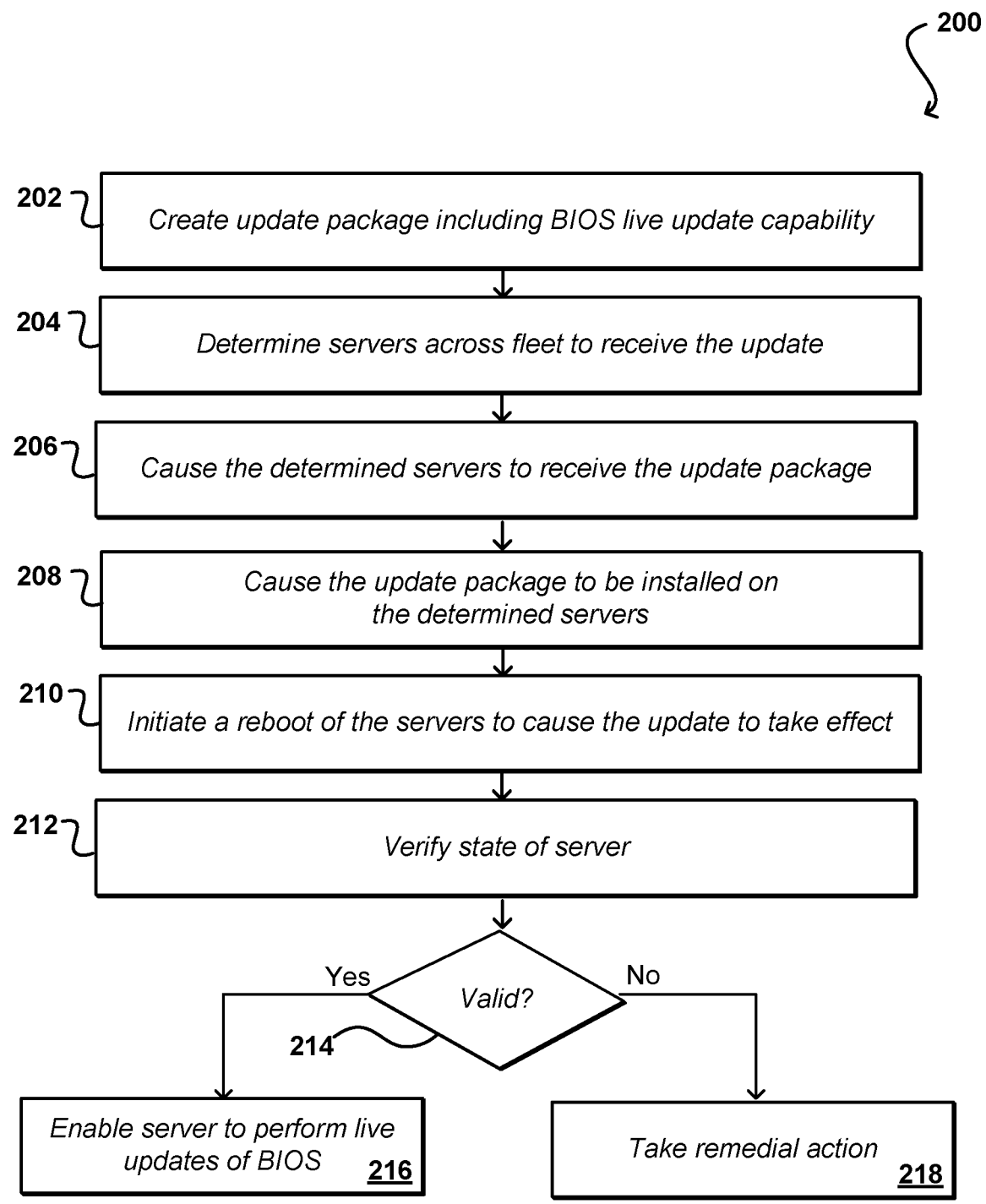
FIG. 2 illustrates an example process for enabling a live update of system software that can be utilized in accordance with various embodiments.

FIG. 2 illustrates an example process 200 for enabling servers (or other computing devices) to perform a live update, or other update at runtime, that can be utilized in accordance with various embodiments. It should be understood for this and other processes discussed herein that there can be additional, alternative, or fewer steps performed in similar or alternative orders, or in parallel, within the scope of the various embodiments unless otherwise stated. This process corresponds to an initial deployment of a live update capability to various servers or other such devices. In this example, an update package is created 202 that, when installed on a computing device (e.g., server), will enable that device to offer BIOS live update capability. As discussed, the update package can be generated by a human user or automatically in response to related updates or requests, among other such options. In some embodiments a human or application can use an interface to provide requested updates, and an update manager can generate the corresponding payload including the relevant information needed to make the updates. The corresponding servers to receive the update can be determined 204, such as by consulting a table of server configurations or requesting configuration information from a set of servers, among other such options. The determined servers can then be caused 206 to receive the update package, such as by sending the update from an update manager or version manager to each server or having the servers pull the update from a central location, among other such options. The update package can then be caused 208 to be installed to the servers that received or obtained the update, as may be determined according to an update schedule in at least some embodiments. A reboot or restart of the respective servers can then be initiated, such as by sending an instruction from a central scheduler or instructing the server to reboot once the update has been installed and customer work has completed on the server, among other such options. In some embodiments a workload manager may determine that a reboot is needed and may stop sending work to the server, and once it is determined that the existing work has completed and the results sent or otherwise handled appropriately, an instruction can be sent to the server to reboot. In this example, upon a reboot or restart the state of the server can be verified 212 using approaches such as those discussed and suggested herein, as well as those that would be apparent to one of ordinary skill in the art in light of the teachings and suggestions contained herein. A determination can be made 214 as to whether the server was updated successfully and the server is in a valid and intended state. If so, the server can resume its workload (or receive new work) and can be enabled 216 to perform subsequent live updates of the BIOS. If the server is not in a valid state as a result of the update, a remedial action can be taken 218, such as may involve rolling back to a prior valid state, taking the server offline, or sending a notification to reconfigure the server, among other such options.

Figure 3:
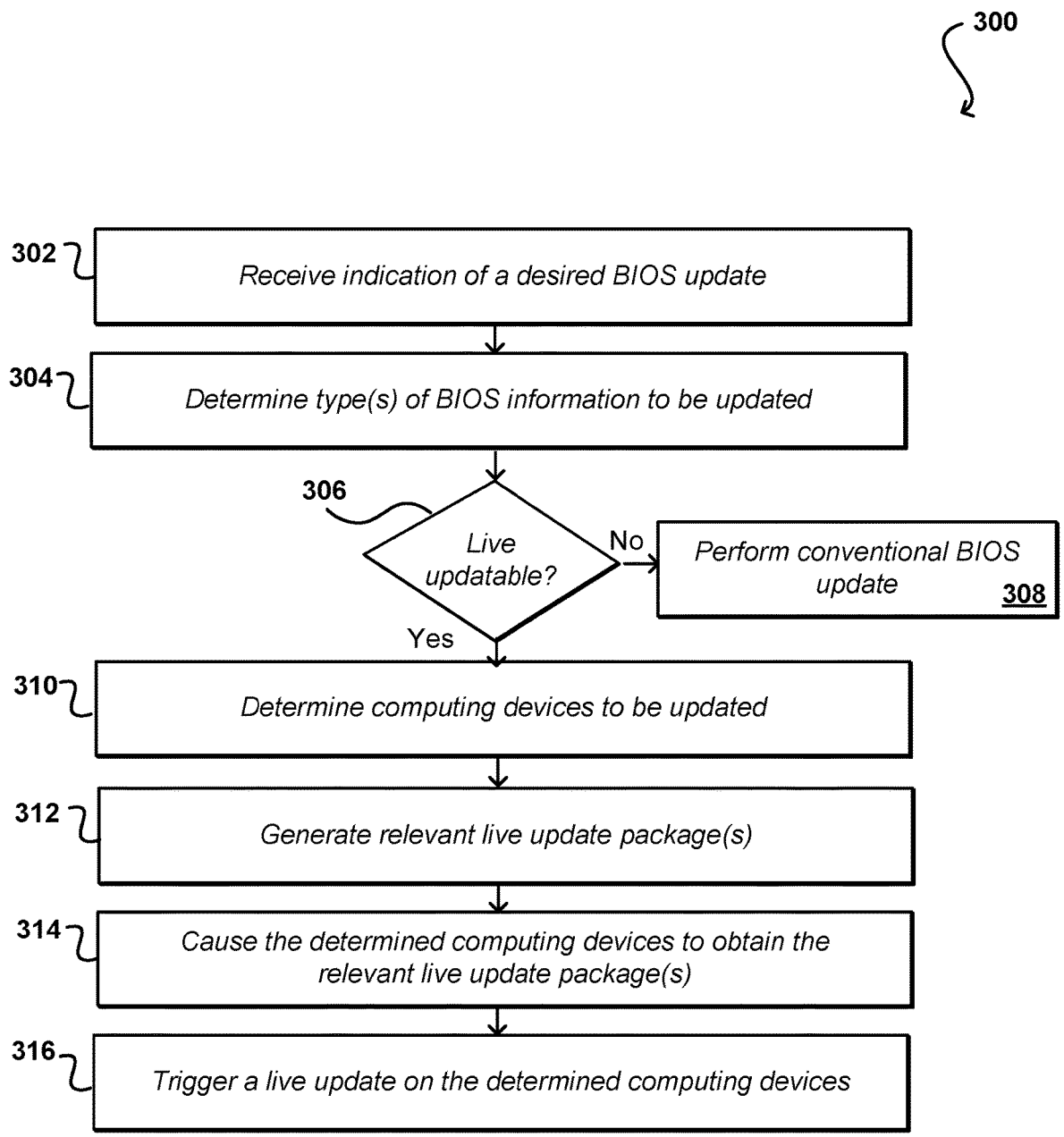
FIG. 3 illustrates an example process for determining an approach to use for a specific system software update that can be utilized in accordance with various embodiments.

FIG. 3 illustrates an example process 300 for determining whether to use alive update process for a BIOS update that can be utilized in accordance with various embodiments. Although not illustrated in this example, a device to be updated can allocate a fixed amount of memory regions for a live BIOS update during a system boot process. In this example, an indication is received 302 with respect to a desired BIOS update to be performed. This might be from a user interface in response to human input, or from a management service of a resource provider environment, among other such options. The scope of the update can be determined, which can include the types of data that are to be updated and where that data is stored. The scope can include data stored to locked registers, unlocked registers, I/O control pins, integrated component states, runtime data, runtime interface software, runtime loadable software, or other memory locations. In this example, the determined scope can be used to determine 304 whether the BIOS information to be updated is of a type, or set of types, that are able to be updated via a live update process, or whether a reboot is needed as per a conventional BIOS update. While this determination is made by a computing device according to decision logic in this example, it should be understood that in some embodiments the instructions to perform a live update may be provided by a human who is aware that the update can be performed at runtime, among other such options. If it is determined 306 according to the decision logic (or by a human user managing the update) that one or more types of information are not live updatable, then a conventional BIOS update (or update requiring a restart or reboot) can be performed 308. As discussed herein, information that is not live-updateable can include any data that touches the silicon, or is stored in a locked register that is unable to be updated at runtime, etc. If any of the types are not live updatable then all updates can be performed via a conventional process, as there would likely be no savings or advantage in at least some embodiments to also using a live update if the machine has to be rebooted for any of the updates anyway.

If it is determined that all the information to be updated is able to be live updated, then a live update can be performed. In this example, the computing devices with BIOS to be updated can be determined 310. This may include first determining one or more types or configurations of devices to be updated (e.g., firmware versions and server types), as well as identifying specific devices or device identifiers, etc. One or more live update packages can be generated 312, where each package may include information or instructions for updating the BIOS information for a respective type or configuration of device. The configuration can include any relevant information, as may include OS version, BIOS version, device type, installed software, device parameter configuration, and the like. In some embodiments a central system or service can be responsible for distributing BIOS components that are live updatable. As mentioned, a firmware package can be generated for distribution of the components. The package can undergo at least some level of verification in some embodiments to ensure that the devices are being updated with correct and compatible BIOS data.

The computing devices that are identified for the update can then be caused 314 to obtain the relevant live update package(s). This can include, for example, sending packages to the devices or causing the devices to pull the package from one or more locations, among other such options. Once an identified device has obtained the update package, a live update can be triggered 316 for that device. As discussed above, this can be triggered by a scheduler or workload manager, for example, which can trigger the live update once all work has been completed on the server, or can send a trigger that a live update should occur once the pending work has completed, among other such options. In some embodiments the work can continue on the computing device during the live update, or may simply be paused during the update. In some embodiments it may be desirable to first complete any pending work or tasks before the live update in order to prevent any data loss in the event of an unsuccessful update. In some embodiments the work may be paused and data stored to persistent storage such that the work can be recovered if necessary.

Figure 4:
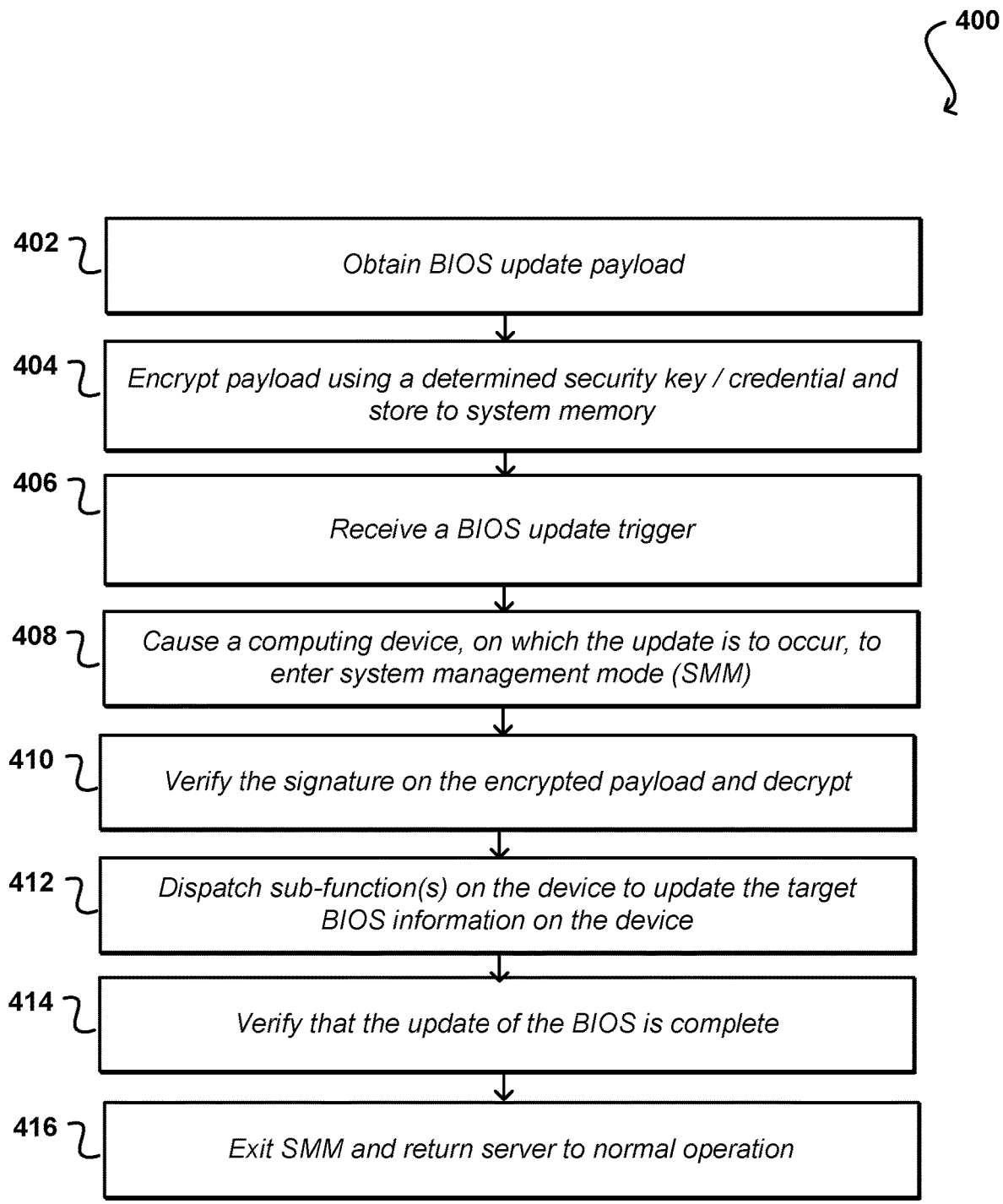
FIG. 4 illustrates an example process for performing a runtime update of system software that can be utilized in accordance with various embodiments.

FIG. 4 illustrates an example process 400 for performing a live update that can be utilized in accordance with various embodiments. This can be part of a process that follows from the process of FIG. 3 in at least some embodiments. Further, although BIOS information is used as an example, it should be understood that other system software and/or firmware can be updated using such a process as well within the scope of the various embodiments. In this example, a BIOS update payload can be obtained 402, such as by generating the payload or receiving the payload from another system, device, or service. The payload can be encrypted 404 using a determined security key or credential, such as an encryption key or key pair that can be rotated at various times. In one embodiment, an asymmetric key (e.g., an RSA-PSS-4096 key) is used for payload signing. The encrypted payload in this example is stored to system memory, although other storage locations can be used as well that may be available from various devices. The encryption and storing to system memory in some embodiments can be performed by a microemulator (uEMU) of a security module, such as a peripheral card on the device to be updated as discussed herein. The uEMU in this example can provide a source and/or root of trust that can be used to enable the live update to be performed using the secured payload. Roots of trust can be obtained in other ways as well, as may be driven by the OS of the given device. During BIOS boot time, in a handshaking process, the BIOS code can provide the physical address and length of the reserved memory region to the system manager or other such module.

At a subsequent point a BIOS trigger update can be received 406, or initiated in some embodiments. This may be in response to a manual instruction or an instruction generated at a certain time or in response to a specified network state, among other such options. The receiving of a trigger can then cause 408 at least one computing device, on which the update is to occur, to enter a special update mode, such as a system management mode (SMM). An update or management mode can include the SMM offered for x86 and similar architectures, or can include a mode with similar capabilities for Advanced RISC Machines (ARM) chips or other such devices. In some embodiments a specific processor (e.g., a CPU) will be caused to enter a SMM. A special mode may not be utilized in all embodiments, but in at least some embodiments it is desirable to suspend at least some data processing operations during the update until it can be verified that a successful update has completed, in order to avoid data loss or corruption, or other negative impacts of an unsuccessful update, etc. The SMM may be initiated by a device on the computer or remote from the computer in various embodiments. While in the management mode, the BIOS update payload can be obtained from system memory and analyzed to verify 410 that the signature on the payload is valid, and that the payload has not been modified or replaced. The payload can be decrypted with the appropriate key or credential, to be used for the update. One or more sub-functions on the device can be dispatched 412 to update the target BIOS information on the device. These functions can include, for example, sub-functions to update microcode, override one or more I/O registers, obtain an initial version of the BIOS live update, and obtain a chained hash of the currently installed updates, among other such options. Such processes can help to update the information stored in various unlocked registers, for example, and verify that the data before and after the update is as expected. For example, if it is determined that the BIOS was in an unexpected state then it may not be desirable to update the BIOS using the payload information as the update may not have an intended result, or end up in the desired state, which could negatively impact the operation of the device. The process can update the BIOS information from the payload and then verify 414 that the update has completed to place the BIOS in a desired state. Determination of a successful update can then cause the device to exit 416 the system management mode (SMM) and return to normal operation, or at least the intended operation after the update of the BIOS information. In various embodiments, an unsuccessful update may cause a remedial action to be taken as discussed with respect to FIG. 2. This may include, for example, a BIOS update that requires a restart or reboot to ensure that the update is applied properly.

In one example of a BIOS update, an I/O register override may want to be performed, such as to re-write a model-specific register (MSR). A determination can be made that the update can be performed without a reboot. Upon determining that the I/O context is to be updated, a relevant instruction or MSR command can be placed in a table. The table can be part of the payload that is then pushed to the uEMU. The uEMU can then inject the payload and initiate system management mode. The processor can then run the script to update the MSR, and the device can exit back to normal runtime operation. When updating, a hash of the payload can be recorded which can later be retrieved to determine whether the BIOS update was successful. A hash function can be selected that is appropriate for error checking of the payload, in order to make sure the correct version was applied, and that there was no tampering with the payload.

In some embodiments the BIOS live update functionality can be created as a firmware module that can be integrated into a BIOS source. In some embodiments the BIOS update process can be initiated using a system management interrupt (SMI). In such an embodiment, system software such as a hypervisor/OS driver can trigger an update by writing the value to an appropriate I/O port. The system can then enter SMM in order to run the BIOS live update process. As mentioned, the system can then verify the reserved memory region and consume the requests, followed by the execution of tasks that update CPU microcode, reinitialize MSR/IO/MMIO registers, get the initial BIOS Live update version, and/or get the current chained hash, among other such options. Such an approach can thus provide a software-SMI based service built in BIOS as a BIOS-software interface for system management software, which can be used at runtime to change hardware initialized values or update static firmware objects like CPU microcode in all logical processors.

Such an approach can be used to update BIOS/hardware subcomponents to mitigate BIOS/hardware issues without rebooting. A live update can thus comprise a deployment of software or firmware without taking the server or system out of service. In the case of a BIOS live update, one or more BIOS subcomponents can be updated to take effect without requiring host reboot. In some embodiments, such an approach can be used to enable system software to trigger a BIOS SMM to update CPU microcode. Such an approach can also be used to allow system software to fill and initiate a new sequence of hardware initialization to override/update current I/O settings. In some embodiments, this can involve providing a software-SMI service driver in SMM as a BIOS-software interface. This interface can hold a certain amount of memory as a buffer for data exchanges between BIOS and system management software. In some embodiments a command line interface (CLI) tool can be provided to feed the data to the buffer then trigger a software SMI. The SMI service can read and verify the data from the buffer and then perform corresponding commands for either updating CPU microcode or running a new I/O initializing sequence to override current I/O hardware behaviors. This can include, for example, changing general purpose I/O (GPIO) input to output to deactivate a hardware input event.

Figure 5:
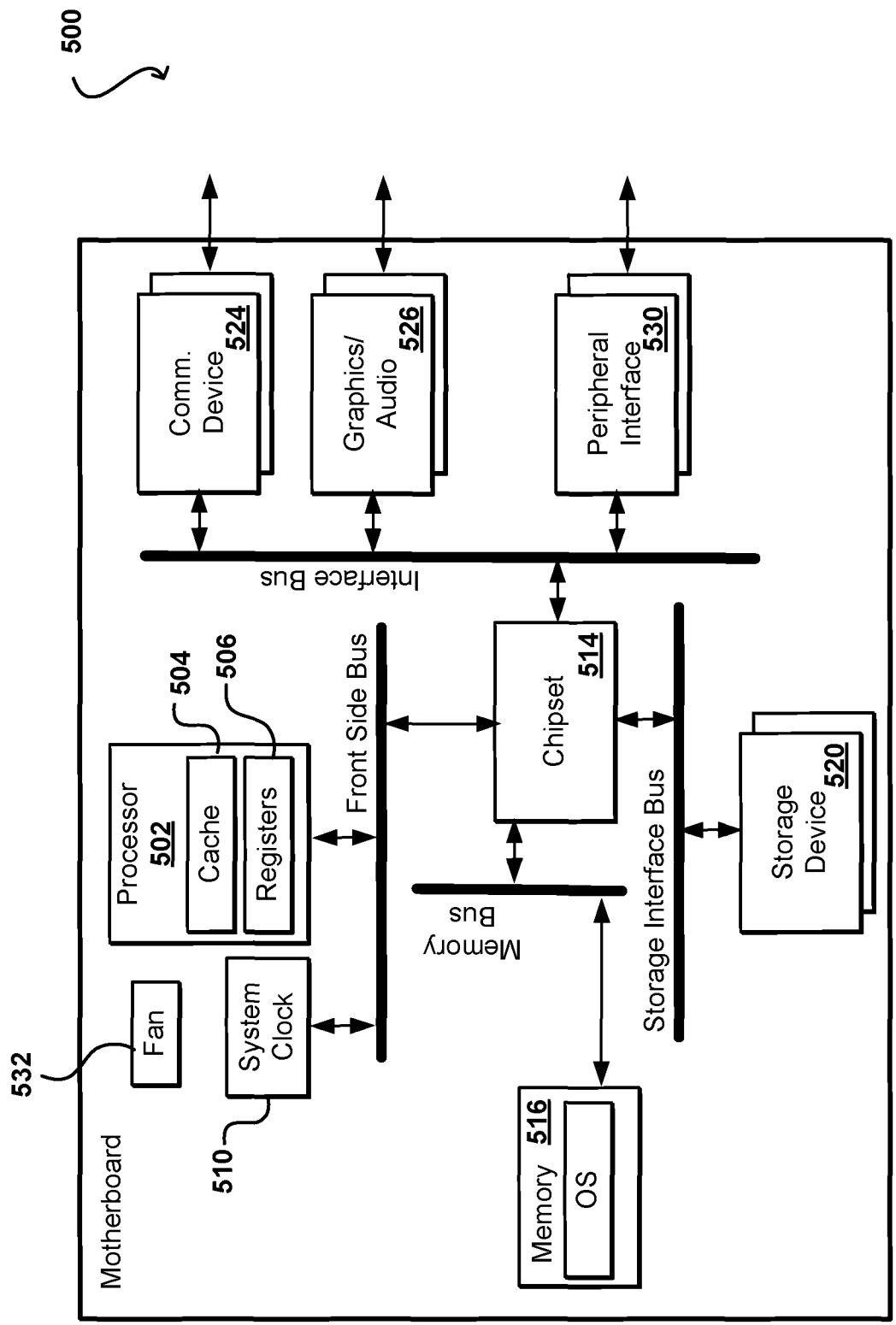
FIG. 5 illustrates components of an example computing device that can be utilized in accordance with various embodiments.

Computing resources, such as servers, that can have software and/or firmware updated in such a matter will generally include at least a set of standard components configured for general purpose operation, although various proprietary components and configurations can be used as well within the scope of the various embodiments. FIG. 5 illustrates components of an example computing device 500 that can be utilized in accordance with various embodiments. As known for computing devices, the computer will have one or more processors 502, such as central processing units (CPUs), graphics processing units (GPUs), and the like, that are electronically and/or communicatively coupled with various components using various buses, traces, and other such mechanisms. A processor 502 can include memory registers 506 and cache memory 504 for holding instructions, data, and the like. In this example, a chipset 514, which can include a northbridge and southbridge in some embodiments, can work with the various system buses to connect the processor 502 to components such as system memory 516, in the form or physical RAM or ROM, which can include the code for the operating system as well as various other instructions and data utilized for operation of the computing device. The computing device can also contain, or communicate with, one or more storage devices 520, such as hard drives, flash drives, optical storage, and the like, for persisting data and instructions similar, or in addition to, those stored in the processor and memory. The processor 502 can also communicate with various other components via the chipset 514 and an interface bus (or graphics bus, etc.), where those components can include communications devices 524 such as cellular modems or network cards, media components 526, such as graphics cards and audio components, and peripheral interfaces 530 for connecting peripheral devices, such as printers, keyboards, and the like. At least one cooling fan 532 or other such temperature regulating or reduction component can also be included as well, which can be driven by the processor or triggered by various other sensors or components on, or remote from, the device. Various other or alternative components and configurations can be utilized as well as known in the art for computing devices.

At least one processor 502 can obtain data from physical memory 516, such as a dynamic random access memory (DRAM) module, via a coherency fabric in some embodiments. It should be understood that various architectures can be utilized for such a computing device, that may include varying selections, numbers, and arguments of buses and bridges within the scope of the various embodiments. The data in memory may be managed and accessed by a memory controller, such as a DDR controller, through the coherency fabric. The data may be temporarily stored in a processor cache 504 in at least some embodiments. The computing device 500 can also support multiple I/O devices using a set of I/O controllers connected via an I/O bus. There may be I/O controllers to support respective types of I/O devices, such as a universal serial bus (USB) device, data storage (e.g., flash or disk storage), a network card, a peripheral component interconnect express (PCIe) card or interface 530, a communication device 524, a graphics or audio card 526, and a direct memory access (DMA) card, among other such options. In some embodiments, components such as the processor, controllers, and caches can be configured on a single card, board, or chip (i.e., a system-on-chip implementation), while in other embodiments at least some of the components may be located in different locations, etc.

An operating system (OS) running on the processor 502 can help to manage the various devices that may be utilized to provide input to be processed. This can include, for example, utilizing relevant device drivers to enable interaction with various I/O devices, where those devices may relate to data storage, device communications, user interfaces, and the like. The various I/O devices will typically connect via various device ports and communicate with the processor and other device components over one or more buses. There can be specific types of buses that provide for communications according to specific protocols, as may include peripheral component interconnect) PCI or small computer system interface (SCSI) communications, among other such options. Communications can occur using registers associated with the respective ports, including registers such as data-in and data-out registers. Communications can also occur using memory-mapped I/O, where a portion of the address space of a processor is mapped to a specific device, and data is written directly to, and from, that portion of the address space.

Such a device may be used, for example, as a server in a server farm or data warehouse. Server computers often have a need to perform tasks outside the environment of the CPU and main memory (i.e., RAM). For example, the server may need to communicate with external entities (e.g., other servers) or process data using an external processor (e.g., a General Purpose Graphical Processing Unit (GPGPU)). In such cases, the CPU may interface with one or more I/O devices. In some cases, these I/O devices may be special-purpose hardware designed to perform a specific role. For example, an Ethernet network interface controller (NIC) may be implemented as an application specific integrated circuit (ASIC) comprising digital logic operable to send and receive packets.

In an illustrative embodiment, a host computing device is associated with various hardware components, software components and respective configurations that facilitate the execution of I/O requests. One such component is an I/O adapter that inputs and/or outputs data along a communication channel. In one aspect, the I/O adapter device can communicate as a standard bridge component for facilitating access between various physical and emulated components and a communication channel. In another aspect, the I/O adapter device can include embedded microprocessors to allow the IO adapter device to execute computer executable instructions related to the implementation of management functions or the management of one or more such management functions, or to execute other computer executable instructions related to the implementation of the I/O adapter device. In some embodiments, the I/O adapter device may be implemented using multiple discrete hardware elements, such as multiple cards or other devices. A management controller can be configured in such a way to be electrically isolated from any other component in the host device other than the I/O adapter device. In some embodiments, the I/O adapter device is attached externally to the host device. In some embodiments, the I/O adapter device is internally integrated into the host device. Also in communication with the I/O adapter device may be an external communication port component for establishing communication channels between the host device and one or more network-based services or other network-attached or direct-attached computing devices. Illustratively, the external communication port component can correspond to a network switch, sometimes known as a Top of Rack ("TOR") switch. The I/O adapter device can utilize the external communication port component to maintain communication channels between one or more services and the host device, such as health check services, financial services, and the like.

The I/O adapter device can also be in communication with a Basic Input/Output System (BIOS) component. The BIOS component can include non-transitory executable code, often referred to as firmware, which can be executed by one or more processors and used to cause components of the host device to initialize and identify system devices such as the video display card, keyboard and mouse, hard disk drive, optical disc drive and other hardware. The BIOS component can also include or locate boot loader software that will be utilized to boot the host device. For example, in one embodiment, the BIOS component can include executable code that, when executed by a processor, causes the host device to attempt to locate Preboot Execution Environment (PXE) boot software. Additionally, the BIOS component can include or takes the benefit of a hardware latch that is electrically controlled by the I/O adapter device. The hardware latch can restrict access to one or more aspects of the BIOS component, such controlling modifications or configurations of the executable code maintained in the BIOS component. The BIOS component can be connected to (or in communication with) a number of additional computing device resources components, such as processors, memory, and the like. In one embodiment, such computing device resource components may be physical computing device resources in communication with other components via the communication channel. The communication channel can correspond to one or more communication buses, such as a shared bus (e.g., a front side bus, a memory bus), a point-to-point bus such as a PCI or PCI Express bus, etc., in which the components of the bare metal host device communicate. Other types of communication channels, communication media, communication buses or communication protocols (e.g., the Ethernet communication protocol) may also be utilized. Additionally, in other embodiments, one or more of the computing device resource components may be virtualized hardware components emulated by the host device In such embodiments, the I/O adapter device can implement a management process in which a host device is configured with physical or emulated hardware components based on a variety of criteria. The computing device resource components may be in communication with the I/O adapter device via the communication channel. In addition, a communication channel may connect a PCI Express device to a CPU via a northbridge or host bridge, among other such options.

In communication with the I/O adapter device via the communication channel may be one or more controller components for managing hard drives or other forms of memory. An example of a controller component can be a SATA hard drive controller. Similar to the BIOS component, the controller components can include or take the benefit of a hardware latch that is electrically controlled by the I/O adapter device. The hardware latch can restrict access to one or more aspects of the controller component. Illustratively, the hardware latches may be controlled together or independently. For example, the I/O adapter device may selectively close a hardware latch for one or more components based on a trust level associated with a particular user. In another example, the I/O adapter device may selectively close a hardware latch for one or more components based on a trust level associated with an author or distributor of the executable code to be executed by the/O adapter device. In a further example, the I/O adapter device may selectively close a hardware latch for one or more components based on a trust level associated with the component itself. The host device can also include additional components that are in communication with one or more of the illustrative components associated with the host device. Such components can include devices, such as one or more controllers in combination with one or more peripheral devices, such as hard disks or other storage devices. Additionally, the additional components of the host device can include another set of peripheral devices, such as Graphics Processing Units ("GPUs"). The peripheral devices and can also be associated with hardware latches for restricting access to one or more aspects of the component. As mentioned above, in one embodiment, the hardware latches may be controlled together or independently.

Figure 6:
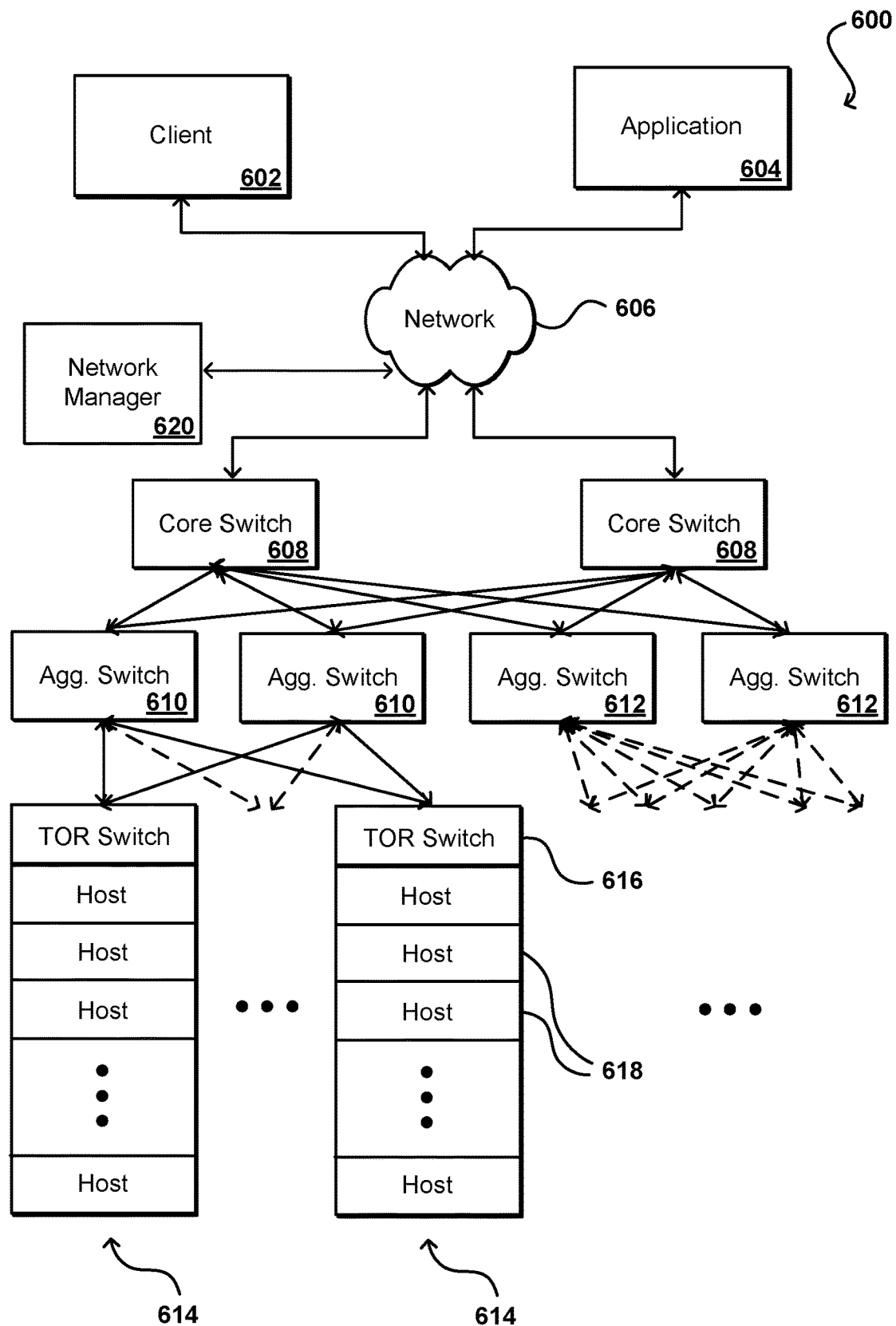
FIG. 6 illustrates components of an example environment in which aspects of the various embodiments can be implemented.

As mentioned, in many instances the live updating of BIOS for a server can occur in a shared resource environment, such as a data center or server farm. FIG. 6 illustrates an example network configuration 600 that can be used to route communications between specific host machines or other such devices in such an environment. This example shows a typical design that can be used for a data center, wherein a source such as a client device 602 or application 604 is able to send requests across at least one network 606, such as the Internet or a cellular network, to be received by one or more components of the data center. Properties of various components of the network, such as provisioned instances, etc., can be managed using at least one management system, component, or service 620. In this example, the requests are received over the network to one of a plurality of core switches 608, but it should be understood that there can be any of a number of other components between the network and the core switches as known in the art. As traditional differentiators have substantially disappeared, the terms "switch" and "router" can be used interchangeably. For purposes of clarity and explanation this document standardizes on the term "switch," but it should be understood this term as used also encompasses routers and other devices or components used for such purposes. Further, the switches can include any appropriate switch, such as a multilayer switch that operates at different levels in an OSI (Open System Interconnection) reference model.

As illustrated, each core switch 608 is able to communicate with each of a plurality of aggregation switches 610, 612, which in at least some embodiments are utilized in pairs. Utilizing aggregation switches in pairs provides a redundant capability in case one or the switches experiences a failure or is otherwise unavailable, such that the other device can route traffic for the connected devices. As can be seen, each core switch in this example is connected to each aggregation switch, such that the tiers in this example are fully connected. Each pair of aggregation switches 610, 612 is linked to a plurality of physical racks 614, each of which typically contains a top of rack (TOR) or "access" switch 616 and a plurality of physical host machines 618, such as data servers and other processing devices. As shown, each aggregation switch can be connected to a number of different racks, each with a number of host machines. For the respective portion of the network, the aggregation pairs are also fully connected to the TOR switches.

As an additional benefit, the use of aggregation switch pairs enables the capability of a link to be exceeded during peak periods, for example, wherein both aggregation switches can concurrently handle and route traffic. Each pair of aggregation switches can service a dedicated number of racks, such as one hundred twenty racks, based on factors such as capacity, number of ports, etc. There can be any appropriate number of aggregation switches in a data center, such as six aggregation pairs. The traffic from the aggregation pairs can be aggregated by the core switches, which can pass the traffic "up and out" of the data center, such as back across the network 606. In some embodiments, the core switches are provided in pairs as well, for purposes including redundancy.

In some embodiments, such as high radix interconnection networks utilized for high-performance computing (HPC) or other such purposes, each physical rack can contain multiple switches. Instead of a single physical TOR switch connecting twenty-one hosts in a rack, for example, each of three switches in the rack can act as a local TOR switch for a "logical" rack (a sub-rack of a physical rack or logical grouping of devices (hosts and/or switches) from multiple racks), with each local TOR switch connecting seven of the host machines. The logical racks can be implemented using physical or wireless switches in different embodiments. In some embodiments each of these switches within a high performance computing rack manages up to twelve servers, but the number can vary depending on factors such as the number of ports on each switch. For example, if a switch contains twenty-four ports, half of those ports typically will be host-facing and the other half will face the external network. A design in accordance with one embodiment could utilize seven racks with three switches in each, with each switch communicating (redundantly) with twelve servers, which would generally be equivalent to twenty-one separate racks each with a single TOR switch communicating with twelve servers, for example. In subsequent figures and description, it should be understood that physical or logical racks can be used within the scope of the various embodiments.

Figure 7:
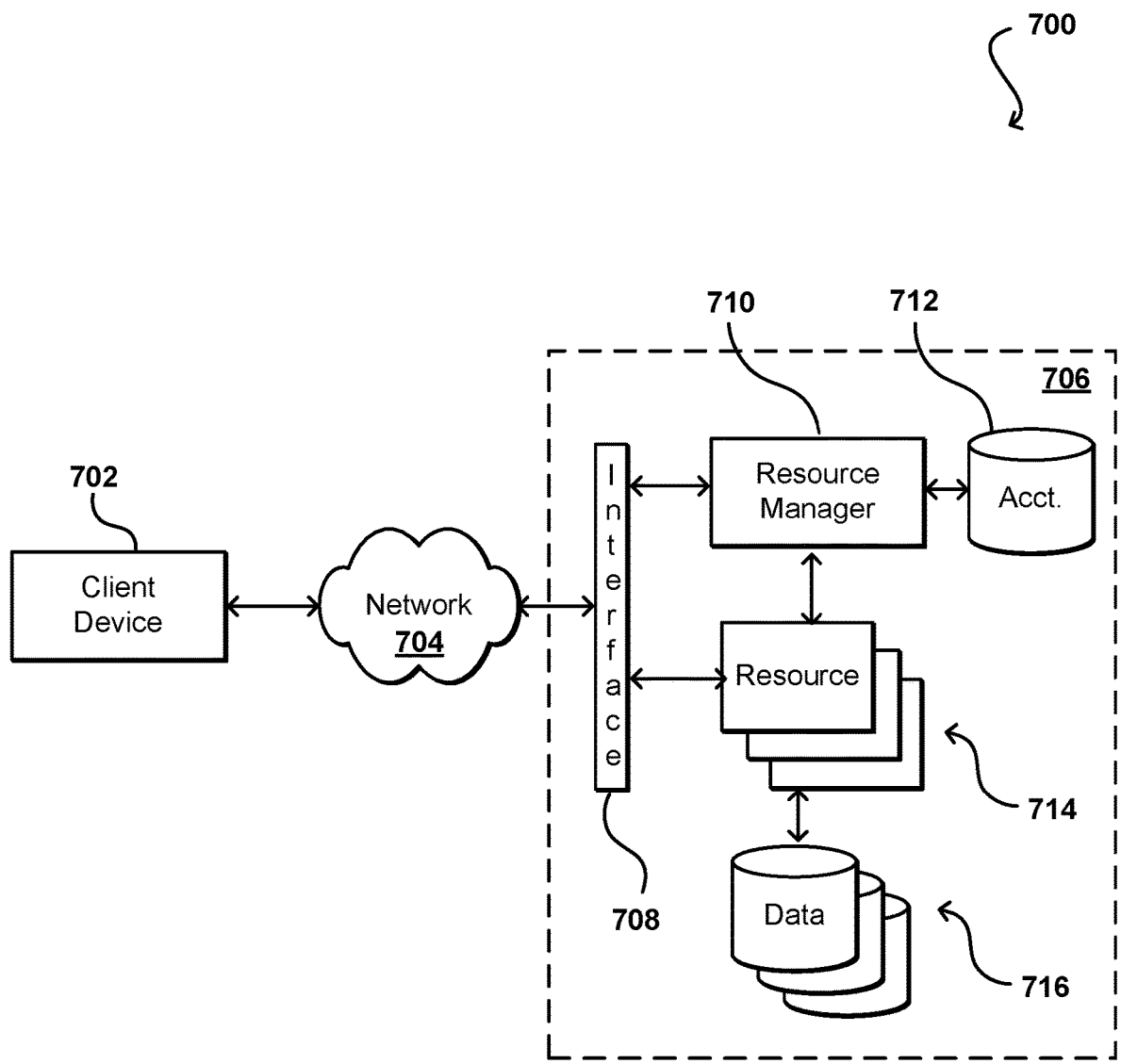
FIG. 7 illustrates components of another example environment that can be used to implement aspects of the various embodiments.

As mentioned, such a configuration can be used in some embodiments to provide resource capacity for one or more users or customers as part of a shared resource environment. FIG. 7 illustrates an example of one such environment 700 in which aspects of the various embodiments can be implemented. In this example a user is able to utilize a client device 702 to submit requests across at least one network 704 to a multi-tenant resource provider environment 706. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 704 can include any appropriate network, including an intranet, the Internet, a cellular network, a local area network (LAN), or any other such network or combination, and communication over the network can be enabled via wired and/or wireless connections. The resource provider environment 706 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 714 of one or more types. These types can include, for example, application servers operable to process instructions provided by a user or database servers operable to process data stored in one or more data stores 716 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 714 can submit a request that is received to an interface layer 708 of the provider environment 706. The interface layer can include application programming interfaces (APIs) or other exposed interfaces enabling a user to submit requests to the provider environment. The interface layer 708 in this example can also include other components as well, such as at least one Web server, routing components, load balancers, and the like. When a request to provision a resource is received to the interface layer 708, information for the request can be directed to a resource manager 710 or other such system, service, or component configured to manage user accounts and information, resource provisioning and usage, and other such aspects. A resource manager 710 receiving the request can perform tasks such as to authenticate an identity of the user submitting the request, as well as to determine whether that user has an existing account with the resource provider, where the account data may be stored in at least one data store 712 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 702 to communicate with an allocated resource without having to communicate with the resource manager 710, at least until such time as a relevant aspect of the user account changes, the user is no longer granted access to the resource, or another such aspect changes.

The resource manager 710 (or another such system or service) in this example can also function as a virtual layer of hardware and software components that handles control functions in addition to management actions, as may include provisioning, scaling, replication, etc. The resource manager can utilize dedicated APIs in the interface layer 708, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 708 in at least one embodiment includes a scalable set of user-facing servers that can provide the various APIs and return the appropriate responses based on the API specifications. The interface layer also can include at least one API service layer that in one embodiment consists of stateless, replicated servers which process the externally-facing user APIs. The interface layer can be responsible for Web service front end features such as authenticating users based on credentials, authorizing the user, throttling user requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, users of the control service. The servers of the Web services layer can be stateless and scaled horizontally as known in the art. API servers, as well as the persistent data store, can be spread across multiple data centers in a region, for example, such that the servers are resilient to single data center failures.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java, C, C# or C++ or any scripting language, such as Perl, Python or TCL, as well as combinations thereof. The server(s) may also include database servers, including without limitation those commercially available from Oracle®, Microsoft*, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of performing a live update of a computing device, comprising:

determining a basic input/output system (BIOS) update to be performed for the computing device, the update involving data stored to unlocked registers on the computing device;

determining that the BIOS update involves data stored to unlocked registers on the computing device, based at least in part on whether the BIOS update requires a reboot or restart of the computing device before the update can take effect;

generating a payload including the information for performing the BIOS update based upon state information for the computing device;

receiving a trigger to perform the update on the computing device;

analyzing the information to determine that the live update will not require altering data stored in a locked register on the computing device, based at least in part on whether the live update requires a reboot or restart of the computing device;

causing the computing device to enter a management mode wherein processing of user data is suspended and external access is restricted;

verifying the payload;

causing a function to be executed on the computing device in order to update corresponding BIOS data stored to the unlocked registers;

verifying accuracy and completeness of the update to the BIOS of the computing device; and causing the computing device to exit the management mode and resume the processing of user data, whereby the BIOS update is performed on the computing device without requiring a reboot or restart of the computing device before the update can take effect.

2. The method of claim 1, wherein the management mode is a System Management Mode (SMM).

3. The method of claim 1, further comprising:
determining the state information for the computing device, the state information including operating system version, firmware version, computing device configuration, or BIOS version to be updated.

4. The method of claim 1, further comprising:
utilizing a microemulator device as a root of trust for purposes of encrypting the payload, storing the encrypted payload to system memory, or generating the trigger to perform the BIOS update on the computing device.

5. The method of claim 1, further comprising:
determining the function to be executed on the computing device in order to update the corresponding BIOS data, the function including a function for updating microcode, a function for overriding one or more I/O registers, a function for obtaining an initial version of the BIOS live update data, or a function for obtaining a chained hash of installed BIOS updates.

6. A computer-implemented method, comprising:
receiving an instruction to perform a live update of firmware for a computing device;

obtaining a payload including information for the live update to be performed with respect to the firmware;

analyzing the information to determine that the live update will not require altering data stored in a locked register on the computing device, based at least in part on whether the live update requires a reboot or restart of the computing device;

causing the computing device to enter a management mode in which at least some functionality is disabled;

verifying the information for the live update;

performing the live update of the firmware using the information of the payload; and causing the computing device to exit the management mode and resume operation with updated firmware and without requiring a reboot or restart of the computing device.

7. The computer-implemented method of claim 6, further comprising:
generating the instruction to perform the live update of the firmware.

8. The computer-implemented method of claim 6, further comprising:
receiving information about a second update to be performed with respect to the firmware;

analyzing the second information to determine that the second update will alter data stored in a locked register on the computing device; and causing the second update to be performed using an update process that involves a restart or reboot of the computing device.

9. The computer-implemented method of claim 6, further comprising:
determining a scope for the live update;

determining state information for the computing device; and generating the payload, wherein the information for the payload is determined in part using the scope and the state information for the computing device.

10. The computer-implemented method of claim 9, further comprising:
determining the state information for the computing device, the state information including operating system version, firmware version, computing device configuration, or BIOS version to be updated.

11. The computer-implemented method of claim 6, further comprising:
determining a current encryption key for a security management component; and decrypting the payload using a current encryption key, or verifying a digital signature on the payload, before performing the live update.

12. The computer-implemented method of claim 6, further comprising:
utilizing a microemulator device as a root of trust for purposes of encrypting the payload, storing the encrypted payload to system memory, and generating a trigger to perform the live update on the computing device.

13. The computer-implemented method of claim 6, further comprising:
determining a function to be executed on the computing device in order to update the firmware via the live update, the function including a function for updating microcode, a function for overriding one or more I/O registers, a function for obtaining an initial version of the firmware live update data, or a function for obtaining a chained hash of installed firmware updates.

14. The computer-implemented method of claim 6, wherein the firmware to be updated comprises BIOS data.

15. The computer-implemented method of claim 6, further comprising:
restricting external access to the computing device while in the management mode.

16. A system, comprising:
at least one processor; and
memory including instructions that, when executed by the at least one processor, cause the system to:
receive an instruction to perform a live update of firmware for a computing device;

obtain a payload including information for the live update to be performed with respect to the firmware;

analyze the information to determine that the live update will not require altering data stored in a locked register on the computing device, based at least in part on whether the live update requires a reboot or restart of the computing device;

cause the computing device to enter a management mode in which at least some functionality is disabled;

verify the information for the live update;

perform the live update of the firmware according to the information of the payload; and cause the computing device to exit the management mode and resume operation with updated firmware and without requiring a reboot or restart of the computing device.

17. The system of claim 16, wherein the instructions when executed further cause the system to:

generate the instruction to perform the live update of the firmware.

18. The system of claim 16, wherein the instructions when executed further cause the system to:

receive information about a second update to be performed with respect to the firmware;

analyze the second information to determine that the second update will alter data stored in a locked register on the computing device; and cause the second update to be performed using an update process that involves a restart or reboot of the computing device.

19. The system of claim 16, wherein the instructions when executed further cause the system to:

determine a scope for the live update;

determine state information for the computing device; and generate the payload, wherein the information for the payload is determined in part using the scope and state information for the computing device, and wherein the state information includes of an operating system version, firmware version, computing device configuration, or BIOS version to be updated.

20. The system of claim 16, wherein the instructions when executed further cause the system to:

decrypt the payload using a current encryption key or verify a digital signature on the payload before performing the live update.

* * * * *